J. A. ANGLADA.
VEHICLE WHEEL RIM.
APPLICATION FILED JUNE 23, 1910.

1,100,815.

Patented June 23, 1914.
3 SHEETS—SHEET 1.

Witnesses:
Edmund Quincy Moses
Gerald E. Terwilliger

Joseph A. Anglada Inventor
By his Attorney
Seward Davis

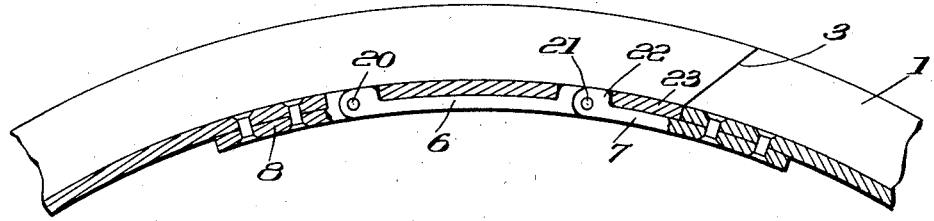
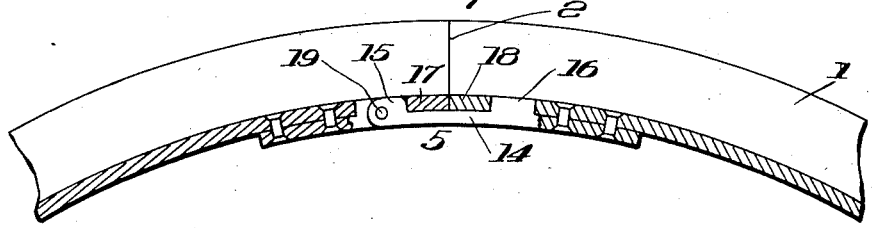
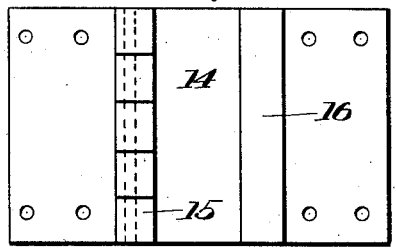
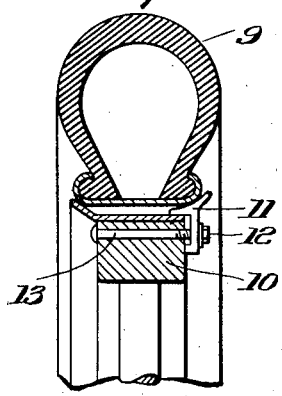
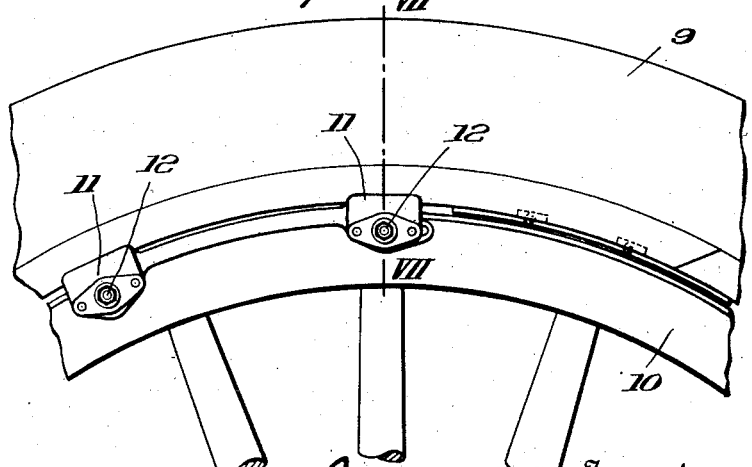

J. A. ANGLADA.
VEHICLE WHEEL RIM.
APPLICATION FILED JUNE 23, 1910.

1,100,815.

Patented June 23, 1914.
3 SHEETS—SHEET 3.

UNITED STATES PATENT OFFICE.

JOSEPH A. ANGLADA, OF NEW YORK, N. Y., ASSIGNOR, BY MESNE ASSIGNMENTS, TO UNIVERSAL RIM COMPANY, OF CHICAGO, ILLINOIS, A CORPORATION OF ILLINOIS.

VEHICLE WHEEL-RIM.

1,100,815.      Specification of Letters Patent.      Patented June 23, 1914.

Application filed June 23, 1910. Serial No. 568,420.

*To all whom it may concern:*

Be it known that I, JOSEPH A. ANGLADA, a citizen of the United States, residing in the city, county, and State of New York, have invented certain new and useful Improvements in Vehicle Wheel-Rims, of which the following is a specification.

My invention relates to vehicle wheel rims for use with pneumatic or other resilient tires, and is primarily adapted for use with pneumatic tires of the clencher or Dunlop type commonly employed in automobile service.

My improved structure is of the form in which the tire-carrying member is transversely split, means being provided for uniting and alining the ends of the rim when in service, and also for detachably securing the tire-carrying rim to the felly of the wheel.

Figure 1:
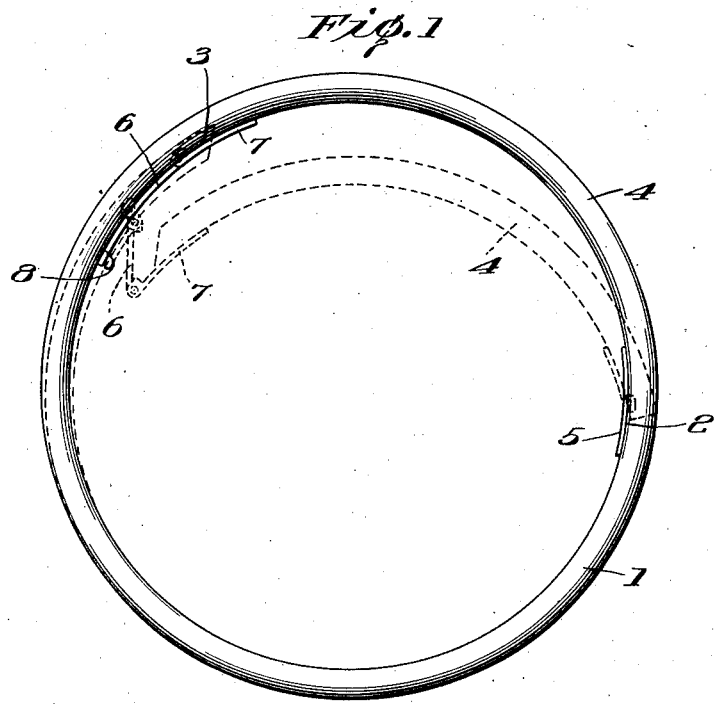
Figure 2:
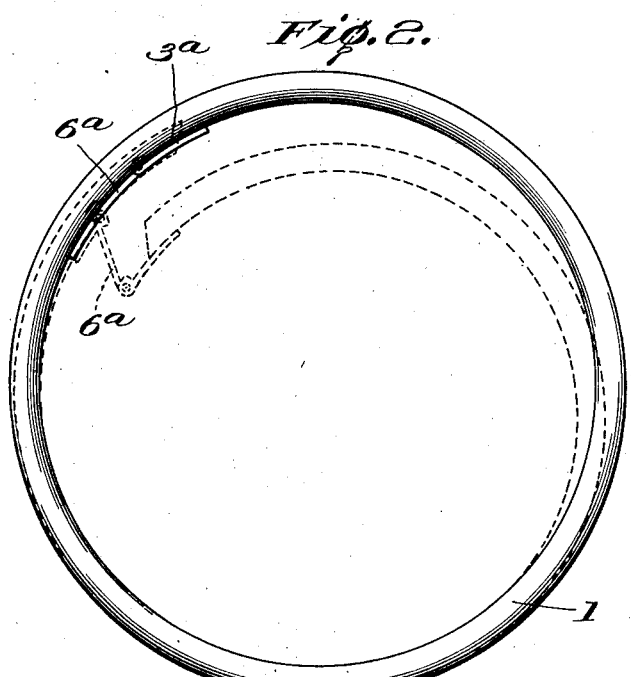
Figure 8:
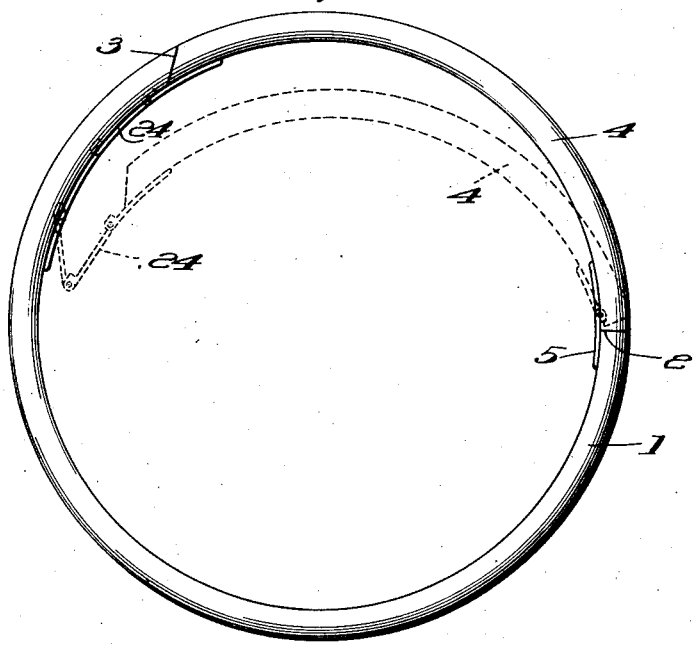

In the accompanying drawings, which form a part of this specification, Figure 1 is a side elevation of a rim embodying my improvement; Fig. 2 is a similar view illustrating a modification thereof; Fig. 3 is a longitudinal section of the rim, parts being broken away to show the construction of the link joint; Fig. 4 is a similar view of the hinge joint of Fig. 1; and Fig. 5 is a plan view of this joint; Fig. 6 is a side elevation of a portion of a wheel equipped with my rim; Fig. 7 is a transverse section taken on line VII—VII of Fig. 6; Fig. 8 illustrates a construction alternative to that of Fig. 1, and Fig. 9 a modification thereof.

Referring in detail to the drawings illustrative of the structure shown in Fig. 1: the numeral 1 designates the tire-carrying rim of a wheel, split transversely at two points, 2 and 3, the plane of at least one of these cuts being preferably oblique to the rim circumference. The segment 4 thus severed from the rim may be permanently secured to the rest of the rim at the point 2 by means of a hinge 5, and at the point 3 by means of a link 6, one end of which is pivoted to the strap 7 secured to the segment 4 of the rim, and the other to the strap 8 secured to the adjacent end of the main portion of the rim. Through the coöperation of the hinge, the link and the natural resiliency of the rim, the severed segment may be moved radially inward, the rim then taking the form shown in the dotted lines of Fig. 1, and permitting the application or removal of the tire in the manner more fully described below. The tire-carrying rim having the tire 9 is detachably secured to the felly 10 by means of wedge members 11 clamped in operative position by the nuts 12 engaging bolts 13. I do not wish, however, to be limited to this method for securing the tire-carrying rim to the felly, as any suitable means may be utilized for this purpose, my invention residing chiefly in the novel structure of the tire-carrying rim. In order to prevent excessive wear or strain on the pivots of the hinge and strap joints and to insure a rigid unitary structure when the tire-carrying rim is in extended position, I preferably construct these joints as illustrated in Figs. 3, 4 and 5. Referring particularly to Figs. 4 and 5, the leaf 14 of the hinge joint is provided with abutments 15 and 16 on either side of the split 2 in the rim. When the rim is in extended position these abutments engage fixed portions 17 and 18 of the tire-carrying rim. By virtue of this construction, the strain is carried by the hinge leaf instead of solely by the pivot 19 and rivets, as would otherwise be the case. In a similar manner the pivots 20 and 21 in the link joint shown in detail in Fig. 3 are relieved from strain, the abutment 22 on the strap 7 engaging the portion 23 of the rim, and the strap thus carrying the major strain.

In the operation of my device, the nuts 12 are unscrewed and the wedges withdrawn, permitting the removal from the felly of the tire-carrying rim and its tire as a unit. By operating the link joint, the movable rim segment is caused to swing inwardly about the hinge, thus permitting the beads of the tire normally engaging the retaining flanges of the rim, to be freed therefrom, and the whole tire to be removed from the tire-carrying rim. Owing to the fact that the diameter of the rim is thus decreased for a considerable arc of the circumference, tires formed with inextensible beads as well as tires having extensible beads may be used. To mount the tire on the wheel, the above operation is reversed. When the tire-carrying rim is thus firmly clamped in position by the forcing home of the wedges, a strong unitary structure is formed. The fact that the link joint, when in extended position, follows the conformation of the rim, further insures rigidity, as the joint is in effect self-locking.

In Fig. 2 I have shown a modification of the tire-carrying rim, in which the rim is split at only one point, as indicated at 3ª. A link joint 6ª connects the ends of the rim and serves as an operating device, acting when broken to contract the rim in the manner illustrated in the dotted lines. This modification is particularly adapted to light rims, which possess a comparatively high degree of resiliency and may be easily sprung, obviating the necessity for the hinge joint.

Figure 9:
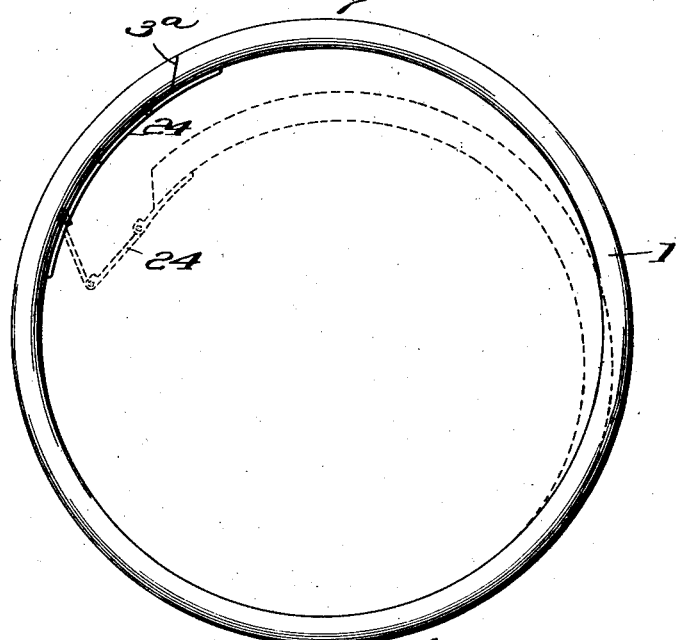

In Figs. 8 and 9 I have illustrated further modifications in which another link is added to the joint of Figs. 1 and 2, thus forming a toggle joint 24. Fig. 8 shows the use of the toggle joint in connection with a hinge, the construction being similar to that of Fig. 1, and Fig. 9 illustrates the utilization of the springing of the rim, as in Fig. 2. The particular advantage of the toggle joint over the hinge joint lies in the fact that in the one construction, that illustrated in Fig. 8, it obviates the necessity for distorting the rim in order to effect its collapse, while in the other modification, shown in Fig. 9, it removes the necessity for deformation on one side of the split in the rim and thus minimizes the total strain which must be imposed upon the rim in order to contract its diameter sufficiently to permit the removal of the tire. This advantage is most apparent in rims of large sizes possessing considerable stiffness and rigidity.

Having thus described certain preferred embodiments of my invention, but without desiring to limit myself to the specific details thereof, I claim:

1. In combination, a transversely split tire-carrying rim, linkage joining the ends thereof, one member of which spans the split in said rim when in operative position, and means carried by said member engaging the rim on either side of the split thereof to cause said member to carry the strain at the joint when the ends of the rim are united.

2. In combination, a transversely split tire-carrying rim, linkage joining the ends thereof, one member of which spans the split in said rim when in operative position, and means carried by said member and integral therewith engaging the rim on either side of the split therein to cause said member to carry the strain at the joint when the ends of the rim are united.

3. In combination, a transversely split tire-carrying rim and a hinge for joining the ends of said rim, one leaf of said hinge having projections adapted to enter slots on either side of the split in said rim.

4. In combination, in a vehicle wheel, a tire-carrying rim transversely split at two points, a hinge for uniting the ends at one of these points, and linkage at the other, and means integral with said linkage coöperating with means on said rim for carrying the strain at the joint when the ends are circumferentially alined.

5. In combination, in a vehicle wheel, a tire-carrying rim transversely split at two points, a hinge for uniting the ends at one of these points, and a toggle joint at the other, and means integral with said toggle coöperating with means on said rim for carrying the strain at the joint when the ends are circumferentially alined.

6. In combination, in a vehicle wheel, a tire-carrying rim split transversely at two points, a hinge for uniting the ends at one of these points, and a toggle joint at the other, one leaf of said hinge having projections adapted to enter slots on either side of the split in said rim.

7. A resilient rim provided with a break therein, a removable arc-shaped piece hinged at each end to the ends of the rim at the break, and adapted to be swung into and to complete the circle of said rim and hold the same in the distended position, substantially as described.

JOSEPH A. ANGLADA.

Witnesses:
　EDMUND QUINCY MOSES,
　KARL S. DEITZ.